United States Patent [19]

Baak et al.

[11] 4,065,317

[45] * Dec. 27, 1977

[54] NOVEL GLASS COMPOSITIONS

[75] Inventors: Nils Tryggve E. A. Baak, Princeton, N.J.; Charles F. Rapp, Toledo, Ohio

[73] Assignee: Nippon Electric Glass Company, Ltd., Otsu, Japan

[*] Notice: The portion of the term of this patent subsequent to Dec. 27, 1991, has been disclaimed.

[21] Appl. No.: 204,672

[22] Filed: Dec. 3, 1971

Related U.S. Application Data

[63] Continuation of Ser. No. 193,576, Oct. 28, 1971, which is a continuation of Ser. No. 193,192, Oct. 27, 1971, which is a continuation of Ser. No. 546,049, April 28, 1966, abandoned.

[51] Int. Cl.² .............................................. C03C 3/00
[52] U.S. Cl. ........................................ 106/52; 106/53; 252/478

[58] Field of Search ...................... 252/478; 106/47, 52

[56] References Cited

U.S. PATENT DOCUMENTS

3,464,932  9/1969  Connelly et al. .................. 252/478

*Primary Examiner*—Stephen J. Lechert, Jr.
*Attorney, Agent, or Firm*—Beveridge, DeGrandi, Kline & Lunsford

[57] ABSTRACT

Glass compositions of the $SiO_2$-$ZrO_2$-alkali metal oxide-alkaline earth oxide system containing 70–82 mole percent $SiO_2$ and 2–8 mole percent $ZrO_2$ and alkali metal oxides and alkaline earth oxides, and optionally $Al_2O_3$, in specified amounts, such glasses being resistant to water, acids and alkalies, having a low to medium thermal coefficient of expansion and a low liquidus temperature.

29 Claims, 4 Drawing Figures

EFFECT ON LIQUIDUS TEMPERATURE WITH THE ADDITION OF $Al_2O_3$ TO $ZrO_2$ CONTAINING GLASS.

LIQUIDUS TEMPERATURES OF $ZrO_2$ GLASSES CONTAINING 2% $Al_2O_3$.

FIG. 3

EFFECT ON LIQUIDUS WITH THE SUBSTITUTION OF $K_2O$ FOR $Na_2O$

FIG. 4

EFFECT ON LIQUIDUS WITH THE SUBSTITUTION OF $ZrO_2$ FOR $SiO_2$

NOVEL GLASS COMPOSITIONS

This application is a continuation of application Ser. No. 193,576, filed Oct. 28, 1971, entitled NOVEL GLASS COMPOSITIONS, and of Ser. No. 193,192, filed Oct. 27, 1971, entitled NOVEL GLASS COMPOSITIONS, which in turn, are continuations of Ser. No. 546,049, filed Apr. 28, 1966, also entitled NOVEL GLASS COMPOSITIONS and now abandoned.

The present invention relates to novel glass compositions, and, more particularly, to unique glass compositions possessing high chemical durability and excellent working characteristics.

A critical need exists for glass compositions having high chemical resistance and a relatively low to medium thermal coefficient of expansion. The need for the type of glass composition is especially acute for the satisfactory fabrication under conventional operating conditions of glass items for the pharmaceutical packaging and the scientific and biological disciplines. Chemical resistance against water, acids, alkali and the like is of extreme importance in the pharmaceutical industry for ampuls, serum vials, transfusion bottles, antibiotic containers, drug jars, pill bottles, and the like. The physical and biological sciences with their sensitive reactions also require glassware, such as tubes, tubing, beakers, flasks, filters and funnels, that is essentially chemically resistant because trace quantities of glass-leachable components may exert a detrimental effect on the sensitive reaction or experiment.

In the past, a number of attempts have been made to develop glasses which possess high chemical durability and good forming properties. These attempts have generally involved the modification of existing prior art glasses, such as the borosilicate and aluminosilicate glasses. While the thus modified prior art borosilicate glasses possess sufficient chemical durability against acids and water, they generally possess poor chemical durability against alkali. Another serious problem with the modified prior art borosilicate glasses is its vapor loss due to the formation of highly volatile sodium borate. This loss may often cause cordiness in the glass and a weakness in the final product. Yet another problem which often arises is the tendency for these glasses to separate into liquid phases which phase separation can cause a weakening of the glass, a lowering of the chemical durability and an increase of the thermal expansion. The aluminosilicate glasses of the prior art and glasses which contain large amounts of zinc oxide have been made in order to attain a high chemical resistance, but the resultant high liquidus temperature of these glasses usually presents forming and molding problems. Other ill-fated attempts have involved the use of zirconia, but zirconia historically is difficult to keep in solution because of its insolubility and because it thereby gives a high liquidus temperature with subsequent devitrification during the forming operation which severely restricts the type of forming and molding operations that may be employed for these glasses.

It will be appreciated by those skilled in the art that if glass compositions are compounded with high chemical durability and excellent working properties for conventional operating conditions, such glass would represent a useful contribution to the art. Likewise, it will be further appreciated by those versed in the art that if the liquidus in a chemically resistant glass can be suppressed to the point where the glass can be blown, drawn, pressed and cast by the usual fabrication procedures, said glass would have a definite commercial value and a positive use for industry and science.

Accordingly, it is an object of the present invention to provide new and improved glass compositions that have desirable chemical and physical properties.

Another object of this invention is to provide novel glass compositions possessing a high degree of chemical resistance.

Still another object of this invention is to provide glass compositions possessing relatively low to medium thermal expansion coefficients.

A further object of this invention is to provide glass compositions with a desirable liquidus to facilitate fabrication of glassware by conventional manufacturing techniques.

Still a further object of this invention is to provide novel glass compositions that possess desirable viscosities at their respective liquidus temperature and are, therefore, capable of being formed on any conventional procedure.

Yet a further object of the present invention is to provide glass compositions containing zirconia that have excellent chemical durability and a suppressed liquidus temperature to give glasses that have excellent working properties by conventional techniques without devitrification.

Yet a further object of the present invention is to provide glass compositions that are essentially free of boron and possess high chemical durability.

Still a further object of the invention is to provide glass compositions that overcome the problems which have been encountered by the prior art glasses.

The specific nature of this invention as well as other objects and advantages will become apparent to those skilled in the art from the following detailed description and now-preferred embodiments of the invention, taken in conjunction with the drawings wherein.

In attaining the objects of this invention, it has now been found that the subject glasses with high chemical durability against water, acids and alkali and with depressed liquidus can be formulated by inventively adding zirconia to the subject glass compositions. The results obtained by the addition of zirconia appear to be unexpected, for zirconia historically is difficult to keep in solution because of its insolubility and because it thereby generally gives a high liquidus temperature with subsequent devitrification during the forming operation which severely restricts the type of forming for these glasses. In the present glasses, it has been found unexpectedly that the liquidus has been depressed to the point where the present glasses have good working properties for any and all conventional means. The liquidus temperatures were measured by a standard laboratory technique. This technique consists essentially of filling a platinum-like boat of about 5 to 6 inches in length, about ⅜ inch in width and about ⅜ inch in height with crushed glass. The boat containing the crushed glass is next placed, for about 16 hours, in a gradient tube furnace. After the heating period, the boat is removed from the furnace, and the glass is then removed from said boat for examination by microscopic means for the first appearance of the primary phase. The temperature corresponding to the first appearance of any crystals is considered the liquidus temperature for the subject glasses. The liquidus temperature as measured by this procedure is the temperature reported herein. Also, the thermal coefficient of expansion for the instant glasses is in the low to medium range, generally about 35 to 55 × $10^{-7}$/° C (0°–300° C) with the now preferred range of about 40 to about 50 which range indicates a good thermal shock resistance and that the glass is, therefore, suitable for a complete line of general industrial and laboratory ware. The present glasses, which are essentially free of boron, eliminate the objectionable properties of boron mentioned previously, such as vapor losses and poor chemical durability against alkali.

The now desired glasses of the present invention generally contain a relatively medium to a relatively high mole percent concentration of zirconia and a relatively low mole percent concentration of alkali and alkaline earth oxides. It has been found that intimate combination of these components produces a glass with the desired chemical durability, with the thermal expansion at a minimum and with good working properties for conventional fabrication means. Generally, the subject glasses will contain silica, alumina, zirconia, alkali oxides and alkaline earth oxides. The glasses may also contain other oxides, such as lead, tin and titanium. Select colorants may also be added to the subject glasses for the desired esthetic effects.

The subject glasses are generally based on the compositional ranges of about 70 to 82 mole percent $SiO_2$, about 2 to 8 mole percent $ZrO_2$, about 0 to 5 mole percent $Al_2O_3$, about 3 to 10 mole percent $R_2O$ wherein R is a member selected from the group consisting of sodium and potassium and mixtures thereof, and from about 2 to 15 mole percent MO, wherein M is a member selected from the group consisting of calcium strontium, barium, and magnesium and mixtures thereof, and wherein the concentration of $R_2O$ and MO is at least 12 mole percent. The glass compositions of the present invention also include compositions comprising about 75 to about 82 mole percent $SiO_2$, about 2 to 8 mole percent $ZrO_2$, about 0 to 5 mole percent $Al_2O_3$, about 3 to 10 mole percent $R_2O$, wherein R is a member selected from the group consisting of lithium, sodium, and potassium and mixtures thereof, about 2 to 15 mole percent MO, wherein M is a member selected from the group consisting of calcium, strontium, barium, and magnesium and mixtures thereof and wherein $R_2O$ and MO have a concentration of at least 10 mole percent, and about 1 to about 3 mole percent of a member selected from the group consisting of PbO, $TiO_2$, and ZnO, and mixtures thereof; and a glass comprising about 75 to about 80 mole percent $SiO_2$, about 2 to 6 mole percent $ZrO_2$, about 1 to 3 mole percent $Al_2O_3$, about 0 to 6 mole percent $Na_2O$, about 0 to 6 mole percent $K_2O$, about 0 to 5 mole percent CaO, about 0 to 5 mole percent SrO, about 0 to 5 mole percent BaO, and where the concentration of $Na_2O$ and $K_2O$ is about 4 to 6 mole percent and wherein the concentration of CaO, BaO, and SrO is about 8 to 12 mole percent.

Various glass compositions with excellent chemical durability and exhibiting melting and forming properties especially suited for the manufacture of glass containers, laboratory ware and the like can be made from the above-disclosed components. As examples of glass compositions within the mode and manner of the present invention are glass compositions comprising from about 75 to about 80 mole percent $SiO_2$, about 4 to 6 mole percent $ZrO_2$, about 2 to 3 mole percent $Al_2O_3$, about 2 to 6 mole percent $K_2O$, about 2 to 6 mole percent $Na_2O$, about 4 to 6 mole percent SrO, and about 4 to 6 mole percent BaO; glass compositions comprising about 75 to 82 mole percent $SiO_2$, about 2 to 8 mole percent $ZrO_2$, about 1 to 5 mole percent $Al_2O_3$, about 2 to 10 mole percent $Na_2O$, about 2 to 10 mole percent $K_2O$, and about 2 to 10 mole percent CaO, about 2 to 10 mole percent SrO, and about 2 to 10 mole percent BaO; a glass comprising about 75 to 82 mole percent $SiO_2$, about 2 to 8 mole percent $ZrO_2$, about 0 to 5 mole percent $Al_2O_3$, about 2 to 10 mole percent $K_2O$, about 0 to 10 mole percent SrO, and about 0 to 10 mole percent BaO, and wherein the concentration of $K_2O$, SrO, and BaO is at least 12 mole percent; a glass comprising about 75 to 82 mole percent $SiO_2$, about 2 to 8 mole percent $ZrO_2$, about 0 to 5 mole percent $Al_2O_3$, about 2 to 10 mole percent $Na_2O$, about 0 to 10 mole percent SrO, and about 0 to 10 mole percent BaO, and wherein the concentration of $Na_2O$, and SrO, and BaO is at least 12 mole percent; a glass comprising about 75 to 82 mole percent $SiO_2$, about 2 to 8 mole percent $ZrO_2$, about 0 to 5 mole percent $Al_2O_3$, about 2 to 10 percent $Na_2O$, about 0 to 10 mole percent CaO, about 0 to 10 mole percent SrO, and about 0 to 10 mole percent BaO, and wherein the concentration of the monovalent and divalent oxides is at least 12 mole percent; a glass comprising about 75 to 82 mole percent $SiO_2$, about 2 to 8 mole percent $ZrO_2$, about 0 to 5 mole percent $Al_2O_3$, about 2 to 10 mole percent $K_2O$, about 0 to 10 mole percent CaO, about 0 to 10 mole percent BaO, and about 0 to 10 mole percent SrO, and wherein the concentration of the monovalent and divalent oxides is at least 13 mole percent; a glass composition comprising 75 to 82 mole percent $SiO_2$, about 2 to 8 mole percent $ZrO_2$, about 0 to 5 mole percent $Al_2O_3$, about 0 to 10 mole percent $Na_2O$, about 0 to 10 mole percent $K_2O$ and wherein the concentration of $Na_2O$ and $K_2O$ is at least 2 mole percent, about 0 to 10 mole percent MgO, about 0 to 10 mole percent CaO, about 0 to 10 mole percent SrO, about 0 to 10 mole percent BaO, and wherein the concentration of MgO, CaO, SrO, and BaO plus $Na_2O$ and $K_2O$ is at least 12 mole percent; a glass composition comprising about 75 to 82 mole percent $SiO_2$, about 2 to 8 mole percent $ZrO_2$, about 0 to 5 mole percent $Al_2O_3$, about 0 to 10 mole percent $Na_2O$, about 0 to 10 mole percent $K_2O$, and wherein the concentration of $Na_2O$ and $K_2O$ is at least 2 mole percent, about 0 to 10 mole percent MgO, about 0 to 10 mole percent SrO, and about 0 to 10 mole percent BaO, and wherein the concentration of the alkali and alkali earth oxides is at least 12 mole percent; a glass composition comprising about 75 to 82 mole percent $SiO_2$, about 2 to 8 mole percent $ZrO_2$, about 2 to 10 mole percent $K_2O$, about 0 to 10 mole percent MgO, and about 0 to 10 mole percent CaO, and wherein the concentration of alkali and alkali earth oxides is at least 12 mole percent; a glass composition comprising about 75 to 82 mole percent $SiO_2$, about 2 to 8 mole percent $ZrO_2$, about 0 to 10 mole percent $K_2O$, about 0 to 10 mole percent $Na_2O$, and wherein the minimum concentration of alkali oxides is at least 2 mole percent, about 0 to 10 mole percent MgO, about 0 to 10 mole percent CaO, and about 0 to 10 mole percent BaO, and wherein the minimum concentration of alkali and alkali earth oxides is at least 12 mole percent; and a glass composition comprising 75 to 82 mole percent $SiO_2$, about 2 to 8 mole percent $ZrO_2$, about 3 to 10 mole percent $Na_2O$, about 0 to 10 mole percent MgO, about 0 to 10 mole percent CaO, and about 0 to 10 mole percent BaO, wherein the minimum concentration of Group IA and Group IIA oxides is at least 12 mole percent.

In preparing glasses of the above composition, the batch ingredients are intimately mixed and heated to such temperatures so that all substances are present in the liquid state, thereby enabling the formation of a glass from a homogeneous melt. Generally, these glasses have coefficients of thermal expansion of about 40 to 50 × $10^{-7}$/° C (0°14 300° C).

The batch ingredients were mixed well by hand or in a V-blender. Melting was done in a 90% platinum-10% rhodium crucible in an electric furnace at 1500° to 1600° C, in an air atmosphere. The melts were usually crushed and remelted at 1450° to 1500° C for 16 to 69 hours to insure homogeneity.

The batch materials employed for preparing the glasses of the invention were of high purity and were selected from the following: $SiO_2$ Kona Quartz, $Al_2O_3$ Alcoa A-14, $ZrSiO_4$ Florida Zircon (milled — 200 mesh), $ZrO_2$ Fisher Purified Reagent, and the following Fisher Certified Reagents and Baker Analyzed Reagents: $Na_2CO_3$, $K_2CO_3$, $Li_2CO_3$, $MgCO_3$, $CaCO_3$, $SrCO_3$, $BaCO_3$, $PbCO_3$, $ZnCO_3$, and $TiO_2$.

Batch constituents for preparing the novel glasses of the instant invention are set forth in the following table, but, of course, other batch constituents for producing the glasses of the present invention may be obtained by substituting desired ingredients within the manner of the invention.

TABLE I

| | BATCH CONSTITUENTS, Gms. | | | | |
|---|---|---|---|---|---|
| Ingredients | Ex. 1 | Ex. 2 | Ex. 3 | Ex. 4 | Ex. 5 |
| $SiO_2$ | 63.03 | 946.31 | 1082.84 | 60.90 | 65.33 |
| $ZrSiO_4$ | 13.45 | 202.05 | | 13.00 | 13.94 |
| $Al_2O_3$ | 2.94 | 44.10 | | 2.84 | 3.05 |
| $Na_2CO_3$ | 3.81 | 57.20 | 119.37 | 3.69 | 3.95 |
| $K_2CO_3$ | 4.97 | 74.82 | | 4.81 | 5.16 |
| $CaCO_3$ | 4.80 | | 112.74 | | 7.48 |
| $SrCO_3$ | 7.08 | 319.56 | | 10.27 | 11.03 |
| $BaCO_3$ | 9.47 | | | 13.75 | |
| $ZrO_2$ | | | 138.78 | | |
| $MgCO_3$ | | | 95.00 | | |

The following examples are representative of now preferred embodiments of glass compositions of the present invention and said glass compositions exhibiting excellent chemical durability and good working characteristics.

EXAMPLE 6

| Batch | Wt. Gms. | Theoretical Composition | Mole Percent |
|---|---|---|---|
| Quartz | 3867 | $SiO_2$ | 80 |
| Calcium Carbonate | 402 | CaO | 5 |
| Magnesium Oxide | 165 | MgO | 5 |
| Sodium Carbonate | 431 | $Na_2O$ | 5 |
| Zirconium Oxide | 495 | $ZrO_2$ | 5 |

The glass of Example 6 was melted for about 31½ hours at about 3000° F in a platinum crucible with mechanical stirring in an atmosphere of 0.5% $O_2$. The glass had an annealing point of 703° C and a strain point of 654° C.

EXAMPLE 7

| Batch | Weight | Theoretical Composition | Mole Percent |
|---|---|---|---|
| Ottawa Sand No. 290 | 3152 | $SiO_2$ | 78 |
| Florida Zircon | 678.3 | $ZrO_2$ | 5 |
| Alumina A-14 | 144 | $Al_2O_3$ | 2 |
| Soda Ash | 189 | $Na_2O$ | 2.5 |
| Potash | 250 | $K_2O$ | 2.5 |
| $CaCO_3$ | 241 | CaO | 3.33 |
| $SrCO_3$ | 357 | SrO | 3.33 |
| $BaCO_3$ | 479 | BaO | 3.33 |

The glass of Example 7 was melted at about 3000° F in a platinum crucible with continuous stirring in an air atmoshere.

EXAMPLE 8

| Batch Materials | Weight Grams | Theoretical Composition | Mole Percent |
|---|---|---|---|
| Ottawa Sand No. 290 | 3156 | $SiO_2$ | 78.0 |
| Florida Zircon | 679 | $ZrO_2$ | 5.0 |
| Alumina A-14 | 144 | $Al_2O_3$ | 2.0 |
| Soda Ash | 193 | $Na_2O$ | 2.5 |
| Calcined Potash | 250 | $K_2O$ | 2.5 |
| $SrCO_3$ | 1073 | SrO | 10.0 |

Figure 1:
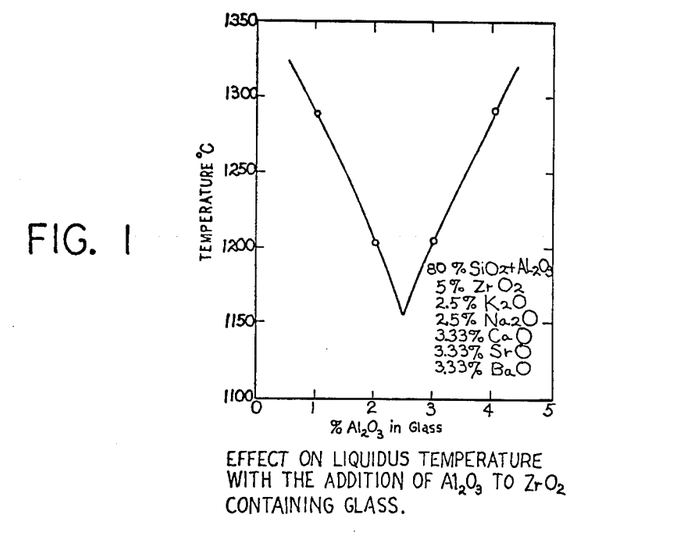
FIG. 1 is a graph showing the effect on the liquidus temperature with the addition of $Al_2O_3$ to $ZrO_2$ containing glass.
Figure 2:
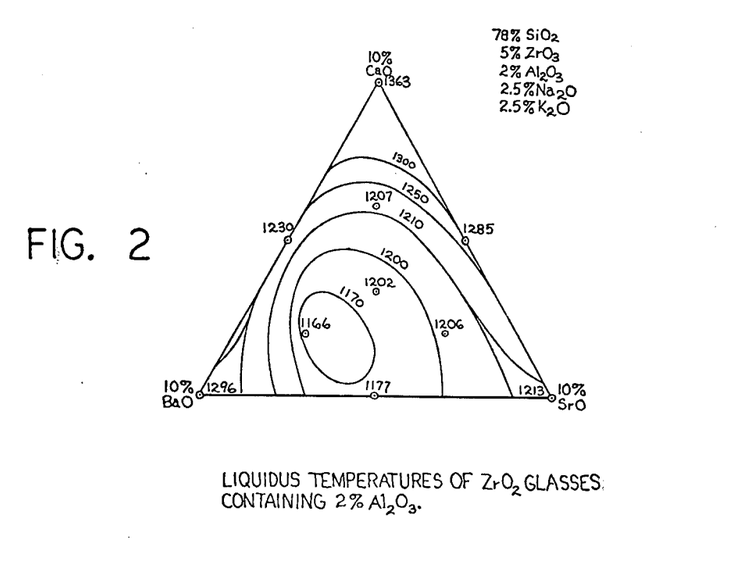
FIG. 2 is a graph showing the liquidus temperature of $ZrO_2$ glasses containing 2% $Al_2O_3$.
Figure 3:
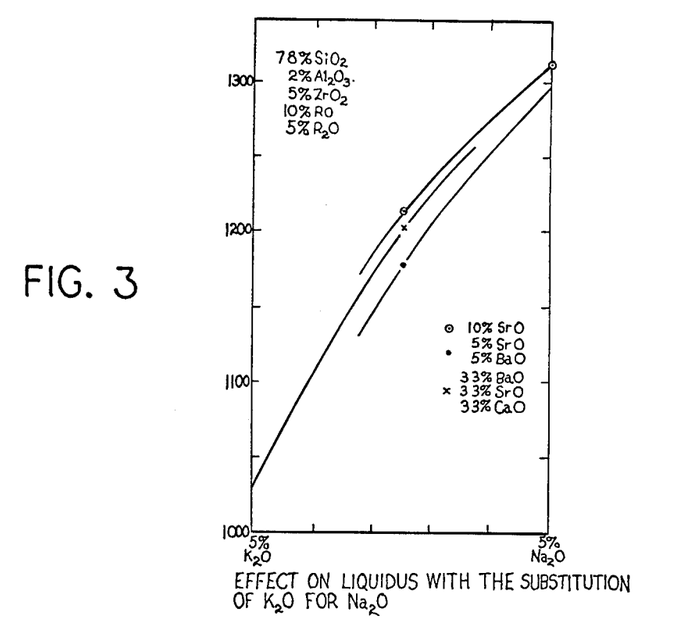
FIG. 3 is a graph showing the effect on the liquidus with the substitution of $K_2O$ for $Na_2O$.
Figure 4:
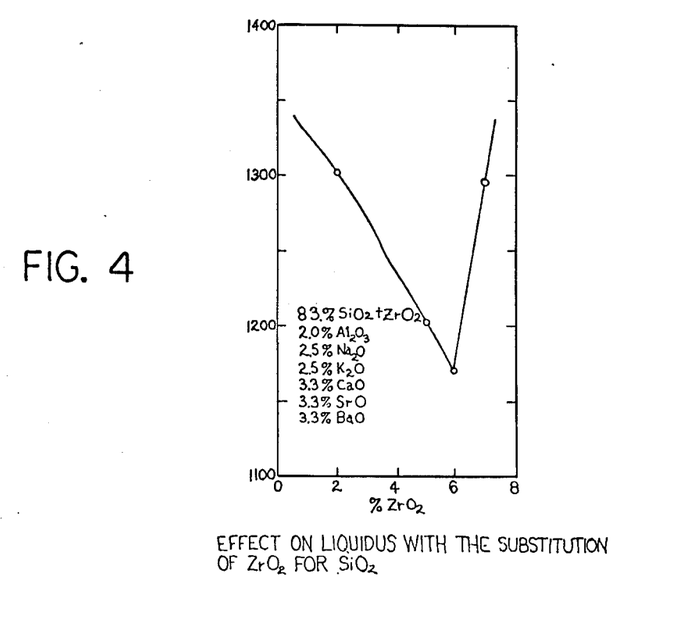
FIG. 4 is a graph depicting the effect on the liquidus with the substitution of $ZrO_2$ for $SiO_2$.

The glass of Example 8 was melted at about 2950° to 3000° F in a platinum type crucible in an 0.5% oxygen atmosphere for about 25 hours. The tables listed immediately below further define the subject glass compositions as made according to the mode and manner of the instant invention and as set forth in FIGS. 1 and 2, disclosed, supra.

TABLE II

Thermal Coefficient of Expansion, Liquidus Temperature and Mole Percent Data for Representative Glasses of the Present Invention

| Example No. | $\alpha \times 10^7$ | $SiO_2$ | $ZrO_2$ | $Al_2O_3$ | $Na_2O$ | $K_2O$ | MgO | CaO | SrO | BaO | PbO | Liquidus ° C |
|---|---|---|---|---|---|---|---|---|---|---|---|---|
| 9 | 47.8 | 80.0 | 5.0 | | 5.0 | | | 10.0 | | | | 1467 |
| 10 | 41.1 | 80.0 | 5.0 | | 5.0 | | 5.0 | 5.0 | | | | 1449 |
| 11 | 42.3 | 80.0 | 5.0 | | 2.5 | 2.5 | 5.0 | 5.0 | | | | 1396 |
| 12 | 36.5 | 80.0 | 5.0 | | 5.0 | | 10.0 | | | | | 1461 |
| 13 | 44.2 | 80.0 | 5.0 | | 5.0 | | 2.5 | 7.5 | | | | 1441 |
| 14 | 37.8 | 80.0 | 5.0 | | 5.0 | | 7.5 | 2.5 | | | | 1458 |
| 15 | 49.2 | 80.0 | 5.0 | | 5.0 | | | | 10.0 | | | 1439 |
| 16 | 42.8 | 80.0 | 5.0 | | 5.0 | | 5.0 | | 5.0 | | | 1427 |
| 17 | 42.7 | 80.0 | 5.0 | | 5.0 | | 4.0 | 4.0 | 2.0 | | | 1431 |
| 18 | 41.5 | 80.0 | 5.0 | | 5.0 | | 4.0 | 2.0 | 4.0 | | | 1447 |
| 19 | 45.1 | 80.0 | 5.0 | | 5.0 | | 2.0 | 4.0 | 4.0 | | | 1456 |
| 20 | 43.5 | 78.0 | 5.0 | 2.0 | 5.0 | | | 4.0 | 4.0 | 2.0 | | 1456 |
| 21 | 50.0 | 78.0 | 5.0 | 2.0 | 5.0 | | | | 10.0 | | | 1313 |
| 22 | 50.8 | 78.0 | 5.0 | 2.0 | 2.5 | 2.5 | | | 10.0 | | | 1213 |
| 23 | 52.9 | 78.0 | 5.0 | 2.0 | 5.0 | | | | 5.0 | 5.0 | | 1299 |
| 24 | 51.4 | 78.0 | 5.0 | 2.0 | 2.5 | 2.5 | | | 5.0 | 5.0 | | 1177 |
| 25 | 45.4 | 78.0 | 4.0 | 2.0 | 5.0 | | 4.0 | 4.0 | 3.0 | | | 1358 |
| 26 | 47.9 | 78.0 | 3.0 | 2.0 | 5.0 | | 4.0 | 4.0 | 4.0 | | | 1357 |
| 27 | 49.9 | 78.0 | 5.0 | 2.0 | 2.5 | 2.5 | | 10.0 | | | | 1363 |
| 28 | | 78.0 | 5.0 | 2.0 | 2.5 | 2.5 | | | | 10.0 | | 1296 |
| 29 | | 78.0 | 5.0 | 2.0 | 2.5 | 2.5 | 5.0 | 5.0 | | | | 1285 |
| 30 | 51.1 | 78.0 | 5.0 | 2.0 | 2.5 | 2.5 | 5.0 | | | 5.0 | | 1230 |

TABLE II-continued
Thermal Coefficient of Expansion, Liquidus Temperature and Mole Percent Data for Representative Glasses of the Present Invention

| Example No. | α × 10⁷ | SiO₂ | ZrO₂ | Al₂O₃ | Na₂O | K₂O | MgO | CaO | SrO | BaO | PbO | ZnO | Liquidus °C | Li₂O |
|---|---|---|---|---|---|---|---|---|---|---|---|---|---|---|
| 31 | 51.1 | 78.0 | 5.0 | 2.0 | 2.5 | 2.5 | | 6.0 | 2.0 | 2.0 | | | 1207 | |
| 32 | 52.1 | 78.0 | 5.0 | 2.0 | 2.5 | 2.5 | | 2.0 | 6.0 | 2.0 | | | 1206 | |
| 33 | 52.6 | 78.0 | 5.0 | 2.0 | 2.5 | 2.5 | | 2.0 | 2.0 | 6.0 | | | 1166 | |
| 34 | 51.7 | 78.0 | 5.0 | 2.0 | 2.5 | 2.5 | | 3.33 | 3.33 | 3.33 | | | 1202 | |
| 35 | 52.4 | 77.0 | 5.0 | 3.0 | 2.5 | 2.5 | | 3.33 | 3.33 | 3.33 | | | 1204 | |
| 36 | 52.2 | 76.0 | 5.0 | 4.0 | 2.5 | 2.5 | | 3.33 | 3.33 | 3.33 | | | 1290 | |
| 37 | 51.3 | 78.0 | 5.0 | 2.0 | | 5.0 | | 3.33 | 3.33 | 3.33 | | | 1030 | |
| 38 | 48.8 | 78.0 | 5.0 | 2.0 | 2.5 | 2.5 | | 2.5 | 2.5 | 2.5 | 2.5 | | 1196 | |
| 39 | 48.1 | 78.0 | 5.0 | 2.0 | 2.5 | 2.5 | 2.5 | 2.5 | 2.5 | | | 1268 | | |
| 40 | 51.2 | 79.0 | 5.0 | 1.0 | 2.5 | 2.5 | | 3.33 | 3.33 | 3.33 | | | 1288 | |
| 41 | 53.3 | 81.0 | 2.0 | 2.0 | 2.5 | 2.5 | | 3.33 | 3.33 | 3.33 | | | 1302 | |
| 42 | 51.0 | 77.0 | 6.0 | 2.0 | 2.5 | 2.5 | | 3.33 | 3.33 | 3.33 | | | 1171 | |
| 43 | 51.1 | 76.0 | 7.0 | 2.0 | 2.5 | 2.5 | | 3.33 | 3.33 | 3.33 | | | 1296 | |
| 44 | 48.3 | 80.0 | 4.0 | | 4.0 | | | 6.0 | | 6.0 | | | | |
| 45 | 41.0 | 80.0 | 5.0 | | 3.0 | | 3.0 | 7.0 | | | | | | 2.0 |
| 46 | 39.8 | 80.0 | 5.0 | | 5.0 | | 7.0 | 3.0 | | | | | | |
| 47 | 37.6 | 80.0 | 5.0 | | 5.0 | | 10.0 | | | | | | | |
| 48 | 41.5 | 80.0 | 5.0 | | 2.5 | 2.5 | 7.0 | 3.0 | | | | | | |
| 49 | 38.0 | 80.0 | 5.0 | | 2.5 | 2.5 | 10.0 | | | | | | | |
| 50 | 64.5 | 75.0 | 5.0 | | 5.0 | 5.0 | 5.0 | 5.0 | | | | | | |
| 51 | 39.2 | 80.0 | 5.0 | | 2.0 | 2.0 | 4.0 | 4.0 | | | | 2.0 | | 1.0 |
| 52 | 39.1 | 80.0 | 5.0 | | 2.5 | 1.5 | 5.0 | 5.0 | | 1.0 | | | | |

Table III, hereinafter set forth, lists physical properties for typical glass compositions as reported above in Examples 7 and 8 made in accordance with the present invention.

TABLE III

| | GLASS COMPOSITION MOLE PERCENT | |
|---|---|---|
| Ingredients | Example 53 | Example 54 |
| SiO₂ | 78 | 78 |
| ZrO₂ | 5 | 5 |
| Al₂O₃ | 2 | 2 |
| Na₂O | 2.5 | 2.5 |
| K₂O | 2.5 | 2.5 |
| CaO | | 3.33 |
| SrO | 10 | 3.33 |
| BaO | | 3.33 |
| PHYSICAL PROPERTIES | | |
| Liquidus °C | 1213 | 1210 |
| Log Viscosity at Liquidus | 4.9 | 5.0 |
| Strain Point | 710 | 700 |
| Annealing Point | 746 | 736 |
| Softening Point | 974 | 980 |
| Working Point | 1338 | 1343 |
| Density | 2.72 | |
| Refraction Index $n_D$ | 1.537 | 1.539 |

Various melts prepared according to the present invention were tested for chemical resistance against water, acid and alkali. A 100 gram sample was crushed as specified by ASTM method procedure as reported in ASTM Designation: C-225-65, Book of ASTM Standards, Part B, Pages 223-228, 1965. A 10 gram sample of the crushed glass is placed into two separate flasks that have been previously aged with the attacking medium. Next, 500 milliliters of the attacking medium, purified water, or for acid as the attacking medium, 50.0 milliliters of 0.02 normal sulfuric is introduced into the respective flasks. The stoppered flasks are then immersed in a constant temperature bath at 90° or minus 0.2° C. and retained there for four hours. After the flasks have cooled, 40 ml. of the extract solution is taken for titration with 0.02 N H₂SO₄ to an excess of 1.0 ml. The solution is back-titrated with 0.02 N NaOH and the percentage of Na₂O dissolved is calculated from the results of the titration to give the effect of water as the attacking medium. A generally similar procedure is followed to measure the effect of an acid attacking medium.

The procedure for alkaline attack is the procedure reported in ASTM Special Technical Publication No. 342, Pages 93-100, 1963. Briefly, the procedure consists in placing 1 gram of crushed glass in a platinum dish to which is added 25 ml. of b 5% NaOH. The dish is covered and heated to 90° C for 6 hours. After the alkaline attack, the solution is filtered and residue is ignited to a constant weight in a platinum crucible. The loss in weight reported in milligrams.

Employing the procedures generally described supra, the chemical durability of a commercially available borosilicate glass, and an aluminosilicate glass were compared with the chemical durability of the subject glasses. The results of these tests are reported in Table IV.

TABLE IV

| | Mole Percent Examples | | | | | | |
|---|---|---|---|---|---|---|---|
| Components | 55 | 56 | 57 | 58 | 59 | 60 | 61 |
| SiO₂ | 83.0 | 80.0 | 80.0 | 80.0 | 78.0 | 78.0 | 63.4 |
| ZrO₂ | | 5.0 | 5.0 | 5.0 | 5.0 | 5.0 | |
| Al₂O₃ | 1.4 | | | 1.0 | 2.0 | 2.0 | 11.4 |
| Na₂O | 4.1 | 5.0 | 2.5 | 1.5 | 2.5 | 2.5 | |
| K₂O | | | 2.5 | 0.5 | 2.5 | | |
| MgO | | 5.0 | 5.0 | 4.0 | | | 12.6 |
| CaO | | 5.0 | 5.0 | 4.0 | | 3.33 | 12.6 |
| SrO | | | | | 10.0 | 3.33 | |
| BaO | | | | 2.0 | | 3.33 | |
| Li₂O | | | | 1.0 | | | |
| PbO | | | | 1.0 | | | |
| B₂O₃ | 11.6 | | | | | | |
| Chemical Durability | | | | | | | |
| Na₂O % Dissolved | | | | | | | |
| Water Attack | 0.001 | 0.001 | 0.001 | 0.0005 | 0.001 | 0.001 | 0.002 |

TABLE IV-continued

| Components | Mole Percent Examples | | | | | | |
|---|---|---|---|---|---|---|---|
| | 55 | 56 | 57 | 58 | 59 | 60 | 61 |
| Acid Attack | 0.006[2] | 0.006[1] | 0.003[1] | 0.002[2] 0.004[1] | 0.003[1] | 0.005[2] | — |
| Alkali Attack Mg/g | 72 | 0.09 | 2.0 | 4.6 | 8.5 | 6.9 | 13 |

[1]$H_2SO_4$ N/50
[2]$H_2SO_4$ N/1000

The above tests and physical measurements clearly demonstrate the unobvious properties that are obtained by the present invention. The sodium hydroxide attack on the subject glass was found to be as small as 1/800 of the attack on borosilicate glass and 1/300 of that on a soda-lime glass. The most desirable glasses of the invention had a relatively low thermal expansion coefficient of about 40 to 50 × $10^{-7}/°$ C, and a desired liquidus of about 1100° to 1200° C. The liquidus temperatures were at a viscosity of about log n=5.0. The total results obtained are seen to indicate the unobvious and unexpected characteristics of the novel glass of the invention.

Glass compositions of the above Examples which are expressed in mole percents can readily be converted to weight percent on the oxide basis, and a number of such Examples are set forth below.

All of the glasses in Table V have compositions such that the $Na_2O$ and/or $K_2O$, $SiO_2$ and SrO total constitutes at least 70% by weight of the total composition.

Glasses of Examples 7, 8, 18, 21, 24, 32 and 41 were found to be resistant to electron and/or X-ray browning and also would absorb X-radiation. The linear absorption coefficient for X-rays at 0.6A was determined to be within the range of about 22 to 39 for glasses of the aforementioned compositions, the values determined for these and the other examples of Table V being shown in the following Table VI:

TABLE VI

| Example No. | Linear Absorption Coefficient at 0.6 A |
|---|---|
| 1 | 30.4 |
| 2 | 39 |
| 4 | 26.2 |
| 5 | 21.3 |
| 7 | 30.3 |
| 8 | 38.9 |

TABLE V

| Ingredients | Examples of Baak et al. Application (Weight Percent) | | | | | | | |
|---|---|---|---|---|---|---|---|---|
| | 1 | 2 | 4 | 5 | 7 | 8 | 15 | 16 |
| $SiO_2$ | 67.4 | 67.5 | 65.2 | 69.9 | 67.5 | 67.6 | 71.0 | 74.5 |
| $ZrO_2$ | 9.0 | 9.1 | 2.8 | 3.0 | 8.9 | 8.9 | 9.1 | 9.6 |
| $Al_2O_3$ | 2.9 | 2.9 | 8.7 | 9.3 | 2.9 | 2.9 | — | — |
| $Na_2O$ | 2.2 | 2.2 | 2.2 | 2.3 | 2.2 | 2.2 | 4.6 | 4.8 |
| $K_2O$ | 3.4 | 3.3 | 3.3 | 3.5 | 3.4 | 3.4 | — | — |
| CaO | 2.7 | — | — | 4.2 | 2.7 | — | — | — |
| SrO | 5.0 | 15.0 | 7.2 | 7.8 | 5.0 | 15.0 | 15.3 | 8.0 |
| BaO | 7.4 | — | 10.6 | — | 7.4 | — | — | — |
| MgO | — | — | — | — | — | — | — | 3.1 |
| Total | 100.0 | 100.0 | 100.0 | 100.0 | 100.0 | 100.0 | 100.0 | 100.0 |
| | 18 | 19 | 20 | 21 | 22 | 23 | 24 | 25 | 26 |
| $SiO_2$ | 75.0 | 74.5 | 73.0 | 68.2 | 67.6 | 66.0 | 65.2 | 73.3 | 73.6 |
| $ZrO_2$ | 9.6 | 9.6 | 9.6 | 8.9 | 8.9 | 8.7 | 8.6 | 7.7 | 5.8 |
| $Al_2O_3$ | — | — | 3.2 | 3.0 | 2.9 | 3.0 | 2.8 | 3.2 | 3.2 |
| $Na_2O$ | 5.0 | 5.0 | 5.0 | 4.6 | 2.2 | 4.4 | 2.1 | 4.9 | 4.9 |
| $K_2O$ | — | — | — | — | 3.4 | — | 3.3 | — | — |
| CaO | 1.8 | 3.5 | 3.5 | — | — | — | — | 3.5 | 3.5 |
| SrO | 6.5 | 7.0 | 3.2 | 15.1 | 15.0 | 7.3 | 7.2 | 4.9 | 6.5 |
| BaO | — | — | — | — | — | 10.8 | 10.9 | — | — |
| MgO | 2.5 | 1.2 | 2.5 | — | — | — | — | 2.5 | 2.5 |
| Total | 100.4 | 100.8 | 100.0 | 99.8 | 100.0 | 100.2 | 100.1 | 100.0 | 100.0 |
| | 29 | 31 | 32 | 33 | 34 | 35 | 36 | 37 |
| $SiO_2$ | 69.9 | 69.4 | 67.6 | 65.6 | 67.5 | 66.3 | 65.0 | 65.0 |
| $ZrO_2$ | 9.2 | 9.1 | 8.9 | 8.6 | 8.9 | 8.8 | 8.7 | 8.8 |
| $Al_2O_3$ | 3.0 | 3.0 | 3.0 | 3.0 | 2.9 | 4.4 | 5.8 | 2.9 |
| $Na_2O$ | 2.3 | 2.3 | 2.2 | 2.2 | 2.2 | 2.2 | 2.2 | — |
| $K_2O$ | 3.5 | 3.5 | 3.4 | 3.3 | 3.4 | 3.4 | 3.4 | 6.7 |
| CaO | 4.2 | 5.0 | 1.8 | 1.6 | 2.7 | 2.8 | 2.7 | 2.7 |
| SrO | 7.7 | 3.0 | 8.8 | 3.0 | 5.0 | 4.9 | 4.9 | 4.9 |
| BaO | — | 4.5 | 4.4 | 13.0 | 7.4 | 7.3 | 7.3 | 7.3 |
| MgO | — | — | — | — | — | — | — | — |
| Total | 99.8 | 99.8 | 100.1 | 100.3 | 100.0 | 100.1 | 99.8 | 100.1 |
| | 39 | 40 | 41 | 42 | 43 | 53 | 54 | 59 | 60 |
| $SiO_2$ | 69.1 | 68.8 | 72.1 | 66.0 | 64.6 | 67.6 | 67.5 | 67.6 | 67.5 |
| $ZrO_2$ | 9.1 | 8.9 | 3.6 | 10.5 | 12.2 | 8.9 | 8.9 | 8.9 | 8.9 |
| $Al_2O_3$ | 3.0 | 1.5 | 3.0 | 2.9 | 2.9 | 2.9 | 2.9 | 2.9 | 2.9 |
| $Na_2O$ | 2.3 | 2.2 | 2.3 | 2.4 | 2.2 | 2.2 | 2.2 | 2.2 | 2.2 |
| $K_2O$ | 3.5 | 3.4 | 3.4 | 3.4 | 3.3 | 3.4 | 3.4 | 3.4 | — |
| CaO | 2.1 | 2.7 | 2.8 | 2.7 | 2.7 | — | 2.7 | — | 2.7 |
| SrO | 3.8 | 5.0 | 5.1 | 4.9 | 4.9 | 15.0 | 5.0 | 15.0 | 5.0 |
| BaO | 5.7 | 7.4 | 7.5 | 7.3 | 7.2 | — | 7.4 | — | 7.4 |
| MgO | — | — | — | — | — | — | — | — | — |
| Total | 100.1 | 99.9 | 99.8 | 100.1 | 100.0 | 100.0 | 100.0 | 100.0 | 100.0 |

TABLE VI-continued

| Example No. | Linear Absorption Coefficient at 0.6 A |
|---|---|
| 15 | 38.0 |
| 16 | 28.6 |
| 18 | 26.8 |
| 19 | 28 |
| 20 | 22.9 |
| 21 | 38.6 |
| 22 | 38.9 |
| 23 | 35.2 |
| 24 | 35.5 |
| 25 | 22.6 |
| 26 | 22.3 |
| 29 | 29.6 |
| 31 | 25.9 |
| 32 | 33.4 |
| 33 | 31.4 |
| 34 | 30.3 |
| 35 | 30.1 |
| 36 | 30 |
| 37 | 30.5 |
| 39 | 27.3 |
| 40 | 30 |
| 41 | 22.6 |
| 42 | 32.1 |
| 43 | 34.3 |
| 53 | 38.9 |
| 54 | 30.3 |
| 59 | 38.9 |
| 60 | 30.3 |

The glass compositions of the present invention may be used for the manufacture of items of commerce such as laboratory glassware, serum bottles, blood transfusion bottles, ampuls, instrument glass and tubing, water gauges, glass piping, porous glass filters, beakers, pill jars, and the like.

While the illustrative embodiments of the invention have been described with particularity, it will be understood that various modifications will be apparent and can readily be made by those skilled in the art without departing from the scope and spirit of the invention.

We claim:

1. A glass composition consisting essentially of 75 to 82 mole percent $SiO_2$, 2 to 8 mole percent $ZrO_2$, 1 to 5 mole percent $Al_2O_3$, 2 to 10 mole percent $Na_2O$, 2 to 10 mole percent $K_2O$, 2 to 10 mole percent CaO, 2 to 10 mole percent SrO, and 2 to 10 mole percent BaO, said composition being essentially free from boron.

2. A glass composition according to claim 1 wherein said composition comprises 75 to 80 mole percent $SiO_2$, 4 to 6 mole percent $ZrO_2$, 1 to 3 mole percent $Al_2O_3$, 2 to 4 mole percent $K_2O$, 2 to 4 mole percent $Na_2O$, 2 to 6 mole percent SrO, 2 to 6 mole percent BaO, and 2 to 6 mole percent CaO.

3. A glass composition according to claim 2 wherein said composition comprises 78 mole percent $SiO_2$, 5 mole percent $ZrO_2$, 2 mole percent $Al_2O_3$, 2.5 mole percent $Na_2O$, 2.5 mole percent $K_2O$, 3.3 mole percent CaO, 3.3 mole percent SrO, and 3.3 mole percent BaO.

4. A glass composition consisting essentially of 75 to 80 mole percent $SiO_2$, 2 to 6 mole percent $ZrO_2$, 1 to 3 mole percent $Al_2O_3$, 0 to 6 mole percent $Na_2O$, 0 to 6 mole percent $K_2O$, 0 to 5 mole percent CaO, 0 to 5 mole percent SrO, and 0 to 5 mole percent BaO, and wherein the concentration of $Na_2O$ and $K_2O$ is 4 to 6 mole percent and wherein the concentration of CaO, BaO, and SrO is 8 to 12 mole percent, said composition being essentially free from boron.

5. A glass composition consisting essentially of

| Ingredients | Mole Percent |
|---|---|
| $SiO_2$ | 70–82 |
| $ZrO_2$ | 2–8 |
| $Al_2O_3$ | 0–5 |
| $Na_2O$ | 0–10 |
| $K_2O$ | 0–10 |
| CaO | 0–15 |
| SrO | 0–15 |
| BaO | 0–15 |
| MgO | 0–15 |
| ($Na_2O$ + $K_2O$) | 3–10 |
| (CaO + SrO + BaO + MgO) | 2–15 | and wherein the concentration of ($Na_2O$ + $K_2O$ + CaO + SrO + BaO + MgO) is at least 12 mole percent, said composition being essentially free from boron.

6. A glass composition according to claim 5 wherein said composition comprises 75 to 80 mole percent $SiO_2$, 4 to 6 mole percent $ZrO_2$, 2 to 3 mole percent $Al_2O_3$, 2 to 6 mole percent $K_2O$, 2 to 6 mole percent $Na_2O$, 4 to 6 mole percent SrO, and 4 to 6 mole percent BaO.

7. A glass composition according to claim 5 wherein said composition comprises 78 mole percent $SiO_2$, 5 mole percent $ZrO_2$, 2 mole percent $Al_2O_3$, 2.5 mole percent $Na_2O$, 2.5 mole percent $K_2O$, and 10 mole percent SrO.

8. A glass composition according to claim 5 wherein said composition comprises 78 mole percent $SiO_2$, 5 mole percent $ZrO_2$, 2 mole percent $Al_2O_3$, 2.5 mole percent $Na_2O$, 2.5 mole percent $K_2O$, 5 mole percent SrO, and 5 mole percent BaO.

9. A glass compodition according to claim 5 wherein said composition comprises 78 mole percent $SiO_2$, 5 mole percent $ZrO_2$, 2 mole percent $Al_2O_3$, 2.5 mole percent $Na_2O$, 2.5 mole percent $K_2O$, 5 mole percent CaO, and 5 mole percent BaO.

10. A glass composition according to claim 5 wherein said composition comprises 78 mole percent $SiO_2$, 5 mole percent $ZrO_2$, 2 mole percent $Al_2O_3$, 2.5 mole percent $Na_2O$, 2.5 mole percent $K_2O$, 6 mole percent CaO, 2 mole percent SrO, and 2 mole percent BaO.

11. A glass composition according to claim 5 wherein said composition comprises 80 mole percent $SiO_2$, 5 mole percent $ZrO_2$, 5 mole percent $Na_2O$, 5 mole percent MgO, and 5 mole percent CaO.

12. A glass composition according to claim 5 wherein said glass composition comprises 77 mole percent $SiO_2$, 5 mole percent $ZrO_2$, 3 mole percent $Al_2O_3$, 2.5 mole percent $Na_2O$, 2.5 mole percent $K_2O$, 3.3 mole percent CaO, 3.3 mole percent SrO, and 3.3 mole percent BaO.

13. A glass composition according to claim 5 wherein said composition comprises 78 mole percent $SiO_2$, 5 mole percent $ZrO_2$, 2 mole percent $Al_2O_3$, 5 mole percent $Na_2O$, 3.3 mole percent CaO, 3.3 mole percent SrO, and 3.3 mole percent BaO.

14. A glass composition according to claim 5 wherein said composition comprises 80 mole percent $SiO_2$, 5 mole percent $ZrO_2$, 5 mole percent $Na_2O$, 2 to 4 mole percent MgO, 2 to 4 mole percent CaO, and 2 to 4 mole percent SrO.

15. A glass composition consisting essentially of

| Ingredient | Mole Percent |
|---|---|
| $SiO_2$ | 75–82 |
| $ZrO_2$ | 2–8 |
| $Al_2O_3$ | 0–5 |
| $Na_2O$ | 0–10 |
| $K_2O$ | 0–10 |
| $Li_2O$ | 0–10 |
| CaO | 0–15 |

-continued

| Ingredient | Mole Percent |
| --- | --- |
| SrO | 0–15 |
| BaO | 0–15 |
| MgO | 0–15 |
| ($Na_2O + K_2O + Li_2O$) | 3–10 |
| ($CaO + SrO + BaO + MgO$) | 2–15 | and wherein the concentration of ($Na_2O + K_2O + Li_2O + CaO + SrO + BaO + MgO$) is at least 10 mole percent and wherein said glass composition contains about 1 to 3 mole percent of a member selected from the group consisting of PbO, $TiO_2$ and ZnO, and mixtures thereof, said composition being essentially free from boron.

16. A glass composition according to claim 15 wherein said glass comprises 80 to 81 mole percent $SiO_2$, 4 to 6 mole percent $ZrO_2$, 2 to 3 mole percent $Na_2O$, 5 to 7 mole percent CaO, 3 to 5 mole percent MgO, and 2 mole percent $Li_2O$.

17. A glass composition according to claim 15 wherein said glass composition comprises 80 mole percent $SiO_2$, 5 mole percent $ZrO_2$, 2 to 3 mole percent $Na_2O$, 4 to 5 mole percent CaO, 4 to 5 mole percent MgO, 1 to 2 mole percent BaO, 2 to 3 mole percent $K_2O$, 1 mole percent $Li_2O$, and 1 to 2 mole percent ZnO.

18. A glass composition consisting essentially of 75 to 82 mole percent $SiO_2$, 2 to 6 mole percent $ZrO_2$, 1 to 3 mole percent $Al_2O_3$, 0 to 6 mole percent $Na_2O$, 0 to 6 mole percent $K_2O$, 0 to 5 mole percent CaO, 0 to 5 mole percent SrO, 0 to 5 mole percent BaO, and wherein the concentration of $Na_2O$ and $K_2O$ is 4 to 6 mole percent and wherein the total concentration of CaO, BaO, and SrO is 8 to 12 mole percent, said composition being essentially free from boron.

19. A glass consisting essentially by mole percent on the oxide basis of about 0–10 mole percent $Na_2O$ and/or 0–10 mole percent $K_2O$, the total of $Na_2O$ plus $K_2O$ constituting 3–10 mole percent, 70–82 mole percent $SiO_2$, 2–15 mole percent strontium oxide, 2–8 mole percent $ZrO_2$, said $Na_2O$ and 1 or $K_2O$, $SiO_2$ and SrO constituting at least about 74% by weight of the total composition.

20. A glass according to claim 19 wherein the SrO content thereof ranges about 3–15% by weight.

21. A glass according to claim 19 wherein said composition contains up to 13% by weight BaO.

22. A glass according to claim 19 wherein said composition contains CaO, BaO, MgO or mixtures thereof, wherein the amount of said CaO, MgO, BaO, or mixtures thereof plus SrO is within the range of 2–15 mole percent.

23. A glass consisting essentially, by mole percent on the oxide basis, of about 70–82 mole percent $SiO_2$, 0–10 mole percent $Na_2O$, 0–10 mole percent $K_2O$, the total of $K_2O + Na_2O$ constitiing 3–10 mole percent, 2–15 mole percent SrO, and 2–8 mole percent $ZrO_2$, said $Na_2O + K_2O + SrO$ being at least 12 mole percent and the total of $SiO_2 + Na_2O + K_2O + SrO$ constituting at least 82 mole percent of the total glass composition.

24. A glass consisting essentially, by weight percent on the oxide basis, of about 65.2 to 76 percent $SiO_2$, 0 to 5 percent $Na_2O$, 0 to 6.7 percent $K_2O$, the total of $K_2O$ and $Na_2O$ constituting from 4.4 to 6.7 percent, 3 to 15.3 percent SrO and 2.8 to 9.7 percent $ZrO_2$.

25. A glass according to claim 24 wherein said composition contains up to 13% by weight BaO.

26. A glass according to claim 24 wherein said composition contains up to 6% by weight total of CaO and MgO.

27. A glass according to claim 23 wherein the SrO content thereof ranges about 3 to 15.3% by weight.

28. A glass according to claim 23 wherein said composition contains up to 13% by weight BaO.

29. A glass according to claim 23 wherein said composition contains up to 6% by weight total of CaO and MgO.

* * * * *

UNITED STATES PATENT OFFICE
CERTIFICATE OF CORRECTION

Patent No. 4,065,317     Dated December 27, 1977

Inventor(s) Nils Tryggve E. A. Baak et al.

It is certified that error appears in the above-identified patent and that said Letters Patent are hereby corrected as shown below:

On the Title Page in "[*] Notice" "Dec. 27, 1991" should read -- Dec. 27, 1994 --.

Signed and Sealed this

Sixteenth Day of May 1978

[SEAL]

Attest:

RUTH C. MASON
Attesting Officer

LUTRELLE F. PARKER
Acting Commissioner of Patents and Trademarks